(12) United States Patent
Cernasov (10) Patent No.: US 7,920,086 B2
(45) Date of Patent: Apr. 5, 2011

(54) DISPLAY FOR DISPLAYING COMPRESSED VIDEO

(75) Inventor: Andrei Cernasov, Ringwood, NJ (US)

(73) Assignee: Honeywell International Inc., Morristown, NJ (US)

( * ) Notice: Subject to any disclaimer, the term of this patent is extended or adjusted under 35 U.S.C. 154(b) by 985 days.

(21) Appl. No.: 11/482,044

(22) Filed: Jul. 7, 2006

(65) Prior Publication Data

US 2008/0018623 A1    Jan. 24, 2008

(51) Int. Cl.
*G09G 3/00* (2006.01)
(52) U.S. Cl. .......................... 342/32; 382/233
(58) Field of Classification Search .................. 345/204, 345/205–699, 8, 32; 349/104–106; 382/211, 382/212, 233; 359/559
See application file for complete search history.

(56) References Cited

U.S. PATENT DOCUMENTS

| | | | |
|---|---|---|---|
| 4,082,431 A * | 4/1978 | Ward, III | 359/15 |
| 5,291,044 A | 3/1994 | Gaboury | |
| 5,414,464 A | 5/1995 | Sasaki | |
| 5,537,492 A * | 7/1996 | Nakajima et al. | 382/232 |
| 5,675,670 A * | 10/1997 | Koide | 382/281 |
| 6,509,927 B1 | 1/2003 | Prater | |
| 6,614,473 B1 | 9/2003 | Kijima | |
| 6,614,483 B1 | 9/2003 | Lee | |
| 6,786,411 B2 | 9/2004 | Chen | |
| 7,602,427 B2 * | 10/2009 | Cernasov | 348/273 |
| 2002/0085107 A1 | 7/2002 | Chen | |
| 2002/0181592 A1 * | 12/2002 | Gagarin et al. | 375/240.18 |
| 2003/0052836 A1 * | 3/2003 | Matsumoto et al. | 345/6 |
| 2003/0113013 A1 | 6/2003 | Hammadou | |
| 2004/0041221 A1 | 3/2004 | Boon | |
| 2004/0042668 A1 | 3/2004 | Kaplinsky | |
| 2004/0084741 A1 | 5/2004 | Boon | |
| 2004/0135903 A1 | 7/2004 | Brooks | |
| 2005/0089239 A1 | 4/2005 | Brajovic | |
| 2005/0225563 A1 * | 10/2005 | Brown et al. | 345/604 |
| 2005/0243025 A1 * | 11/2005 | Fish et al. | 345/55 |
| 2006/0017678 A1 * | 1/2006 | Shiomi | 345/89 |

FOREIGN PATENT DOCUMENTS

WO    WO 2005/120169 A2 *   12/2005 .................. 345/98

* cited by examiner

*Primary Examiner* — Chanh Nguyen
*Assistant Examiner* — Allison Walthall
(74) *Attorney, Agent, or Firm* — Ingrassia Fisher & Lorenz, P.C.

(57) ABSTRACT

A display is configured to display transformed video. The display includes a display unit comprising pixels. The display also includes a set of filter elements positioned adjacent to the display unit. The set of filter elements enable the display unit to display transformed video.

14 Claims, 6 Drawing Sheets

DISPLAY FOR DISPLAYING COMPRESSED VIDEO

FIELD

This disclosure generally relates to displays. More particularly, the subject matter of this disclosure pertains to displays that are capable of displaying compressed video.

BACKGROUND

Conventional displays receive video signals which represent either still or moving images. Conventional displays require that the video signals be uncompressed in order to properly display the video.

Typically, video is stored or transmitted in compressed format such as Joint Photographic Experts Group (JPEG) format for still images and Moving Pictures Experts Group (MPEG) for moving images. For example, in JPEG compression, the image is down sampled from the original 12- or 14-bit data back to 8 bits before performing the JPEG compression. Then, a large set of calculations must be performed on the image data to compress the image. Accordingly, any compressed video signal must be decompressed before a conventional display may display the video. Thus, a separate processor or a processor in the display must decompress the video signal before the video may be displayed.

Indeed, some digital devices that include a display, such as a digital camera or cell phone, may include a separate digital signal processor or other form of processor in order to perform decompression, such as JPEG decompression. Therefore, support of the decompression algorithm can consume a large amount of time and power in such digital devices.

It may be desirable to reduce the amount of processing and power required for digital devices. Due to their popular acceptance, compressed video can be generated and handled by a wide variety of devices. For example, portable devices like video cameras, mobile phones, personal digital assistants (PDAs), digital media players such as I-Pods etc., are now capable of displaying video, such as JPEG images or MPEG images. However, these devices must also conserve space used by the components and the amount of power they consume (since they run on batteries). It may also be desirable to speed the processing related to decompression, such as, for security applications.

Accordingly, it would be desirable to systems and methods that efficiently implement decompression algorithms to display compressed video, such as a JPEG, image without the extra processing and hardware involved.

SUMMARY

Embodiments of the present teaching are directed to a display configured to display transformed video. The display comprises a display unit comprising pixels and a set of filter elements positioned adjacent to the display unit. The set of filter elements enable the display unit to display transformed video.

Embodiments also are directed to a display configured to display transformed video by transforming light emitted by a display unit. The display comprises a display unit comprising video divisions. The video divisions are arranged in blocks and each video division comprises sub-divisions. The display also includes a set of filter elements positioned adjacent to the display unit. Each filter element of the set of filter elements comprises sub-divisions corresponding to the sub-divisions in an adjacent video division.

Embodiments are also directed to a device which comprises a video source capable of providing a compressed video signal representing transformation values of a compression method. The device also comprises a display configured to display the compressed video signal based on the transformation values.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several embodiments of the invention and together with the description, serve to explain the principles of the invention.

DETAILED DESCRIPTION

As noted above, in conventional displays, video, which includes still and moving images, is usually imputed to or stored in the displays in a compressed format, such as JPEG or MPEG. The display device uses "back-end" processing to decompress the video into a format that may be displayed by the display. Unfortunately, this type of "back-end" processing often requires the use of a separate digital signal processor or a separate computing device to perform the calculations necessary for the decompression algorithm. As such, conventional devices consume a large amount of power, take long times to decompress the video, and increase in size to accommodate additional hardware.

However, embodiments of the present teaching provide a display that implements "front-end" processing to perform part of a decompression or transformation algorithm when displaying video. In particular, the display uses transformation values of the compression or transformation algorithm directly as the video signal. The display includes a filter which converts the transformation values inputted to the display into the actual viewable video.

For example, a display may be composed of video divisions, such as pixels. Each division is subdivided into sub-divisions, such as sub-pixels. Each sub-division of display device generates light corresponding to a transformation coefficient of compressed video. The transformation coefficient may be a whole or partial coefficient. The number of sub-divisions corresponds to the number of transformation coefficients or partial coefficients used by the compression algorithm.

A set of filters or a filter with multiple divisions is positioned in front of the display. The filter (or filters) is divided into sub-divisions that correspond to the sub-divisions of the divisions of the display. Each sub-division of the filter has a transmissivity related to inverse transformation coefficients or partial coefficients of the compression or transformation algorithm. As such, the filter transforms the light generated by the display into an actual viewable video signal. Accordingly, the display device produces video without having to decompress or electronically transform the compressed or transformed video signal.

In addition, in order to simplify the display device, a reduced or compressed number of transformation coefficients or partial coefficients (such as 20) may be used. Also, subdivisions across different divisions, but corresponding to the same inverse transformation coefficient or partial coefficient may be connected in parallel.

By using "front-end" processing, embodiments of the present teaching can be implemented using less power, less memory, and reduced physical size. In addition, such "front-end" processing may significantly reduce or even eliminate delays in displaying video and power consumption of a display. Thus, for example, the performance of small size, battery powered, camera and display systems such as cell phones, web cameras, digital cameras, and surveillance systems may be enhanced.

Reference will now be made in detail to the present exemplary embodiments of the invention, examples of which are illustrated in the accompanying drawings. Wherever possible, the same reference numbers will be used throughout the drawings to refer to the same or like parts.

Figure 1:
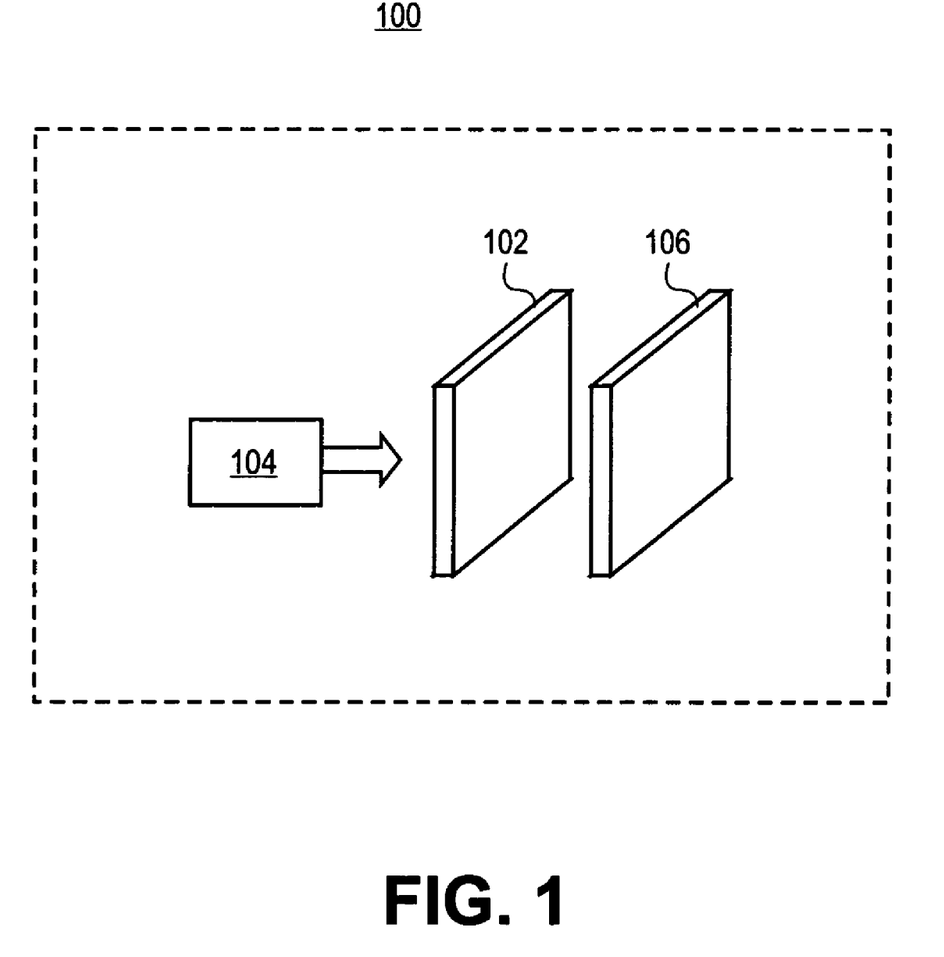
FIG. 1 is a block diagram illustrating an exemplary display consistent with embodiments of the present teaching.

FIG. 1 is a block diagram illustrating an exemplary display 100 consistent with embodiments of the present teaching. Display 100 may be any type of display capable of producing video, such as a still image or moving image, based on a video signal. For example, display 100 may be a liquid crystal display (LCD). It should be readily apparent to those of ordinary skill in the art that display 100 illustrated in FIG. 1 represents a generalized schematic illustration and that other components may be added or existing components may be removed or modified.

Display 100 may be a stand alone display that receives video signals from an external device. For example, display 100 may be a monitor coupled to a computing device. Further, display 100 may be incorporated in a device that stores, receives, or captures compressed data. For example, display 100 may be a video screen in a cell phone or digital camera. One skilled in the art will realize that display 100 may be utilized with any type of device capable of producing, outputting, transmitting, or receiving video such as still images or moving images.

As illustrated in FIG. 1, display 100 includes a display unit 102 and a display control 104. For example, if display 100 is an LCD, display unit 102 may include a light source such as a light emitting diode (LED) backlight. Further, if display 100 is an LCD, display unit 102 may include a liquid crystal panel that comprises video divisions such as pixels positioned in front of the light source. One skilled in the art will realize that display unit 102 may include any additional hardware, software, firmware, or combination thereof to produce video based on a video signal.

As illustrated in FIG. 1, display 100 also includes display control 104. Display control 104 may include any hardware, software, firmware or combination thereof to control display unit 102 and to provide a compressed video signal to display unit 102. One skilled in the art will realize that display unit 104 may include any additional hardware, software, firmware, or combination thereof to control display unit 102 and provide a compressed video signal to display unit 102.

Display 100 also includes a filter 106. Filter 106 may be positioned in front of display unit 102 to alter light generated by display unit 102. Filter 106 may be integrated into display 100. Likewise, filter 106 may be adapted to be attached and removed from display 100. Filter 106 may be a single filter with multiple divisions. Likewise, filter 106 may be multiple individual filters.

Filter 106 may be composed of any material capable of changing properties of light passing through filter 106. For example, filter 106 may be composed of a partially opaque optical material that changes the amount of light passing through filter 106. One skilled in the art will realize that filter 106 may be composed of any known material capable of changing the properties of light.

Filter 106 (or filters) performs "front-end" processing on light emitted from display unit 102. Filter 106 may perform part of a decompression or inverse transformation algorithm on a compressed or transformed video signal being displayed by display 100. For example, the compression algorithm may be JPEG or MPEG.

To display compressed video, display unit 102 generates light based on the transformations values of the compression or transformation algorithm. Filter 106 performs "front-end" processing by receiving light from display unit 102 which represents transformation values. Filter 106 then performs a part of the decompression or inverse transformation algorithm on the light, representing the inverse transformation values, to produce actual viewable video.

As mentioned above, filter 106 may be composed of multiple divisions or filter 106 may be multiple individual filters. Each division of filter 106 (or individual filter) may be positioned adjacent to the video divisions of display unit 102. For example, each division of filter 106 (or individual filter) may be positioned adjacent to a corresponding pixel in display unit 102. Each division of filter 106 (or individual filter) may be configured to alter light generated by the corresponding division of display unit 102.

Divisions of both filter 106 (or individual filter) and display unit 102 may also be further sub divided. In such a case, each sub-division of display unit 102 generates light corresponding to a compressed or transformed video signal. Each sub-division of display unit 102 generates light by receiving a specific transformation value of the compression or transformation algorithm. Each sub-division of filter 106 (or individual filter) is related to the respective transformation value of the corresponding sub-division of display unit 102. As such, each sub-division of filter 106 (or individual filter) inverse transforms the light generated by the corresponding sub-division of display unit 102 into actual video. By this process, display 100 produces video without having to perform additional processing on the compressed or transformed video signal.

FIGS. 2-5 illustrate an exemplary filter 106 which may be used in display 100. Filter 106 may be configured to be used with transform encoding for video such as the JPEG compression algorithm for a still image or MPEG compression algorithm for moving images. Filter 106 alters the light output by display unit 102 such that the light corresponding to the transformation coefficients of the JPEG or other transformation algorithm output by display panel 102 is converted to actual viewable video. It should be readily apparent to those of ordinary skill in the art that filter 106 illustrated in FIGS. 2-5 represents generalized schematic illustrations and that other components may be added or existing components may be removed or modified.

The JPEG algorithm is designed to compress either color or grey-scale digital images. Conceptually, JPEG compresses a digital image based on a mathematical tool known as the DCT and empirical adjustments to account for the characteristics of human vision.

The basic DCT can be expressed by the formula:

$$D(i,j) = \frac{2}{\sqrt{MN}} C(i)C(j) \sum_{m=0}^{m=M-1} \sum_{n=o}^{n=N-1} p(m,n) \cos\left[\frac{(2m+1)i\pi}{2M}\right] \cos\left[\frac{(2n+1)j\pi}{2N}\right]$$

where C(i) and C(j) coefficients are:

C(k)=1/√2 (for k=0), or =1 (for k>0); and where p(m,n) represents the pixel values, either intensity or color.

JPEG applies the DCT to an elementary image area (called an "image block") that are 8 pixels wide and 8 lines high. This causes the basic DCT expression to simplify to:

$$D(i, j) = \frac{1}{4} C(i)C(j) \sum_{m=0}^{m=7} \sum_{n=o}^{n=7} p(m, n) \cos\left[\frac{(2m+1)i\pi}{16}\right] \cos\left[\frac{(2n+1)j\pi}{16}\right]$$

Therefore, in essence, JPEG uses the DCT to calculate the amplitude of spatial sinusoids that, when superimposed, can be used to recreate the original image.

In order to compress the data for an image, JPEG also combines a set of empirical adjustments to the DCT. The empirical adjustments have been developed through experimentation and may be expressed as a matrix of parameters that synthesizes or models what a human vision actually sees and what it discards. Through research, it was determined that a loss of some visual information in some frequency ranges is more acceptable than others. In general, human eyes are more sensitive to low spatial frequencies than to high spatial frequencies. As a result, a family of quantization matrices Q was developed. In a Q matrix, the bigger an element, the less sensitive the human eye is to that combination of horizontal and vertical spatial frequencies. In JPEG, quantization matrices are used to reduce the weight of the spatial frequency components of the DCT processed data, i.e., to model human eye behavior. The quantization matrix $Q_{50}$ represents the best known compromise between image quality and compression ratio and is presented below.

$$Q_{50} = \begin{bmatrix} 16 & 11 & 10 & 16 & 24 & 40 & 51 & 61 \\ 12 & 12 & 14 & 19 & 26 & 58 & 60 & 55 \\ 14 & 13 & 16 & 24 & 40 & 57 & 69 & 56 \\ 14 & 17 & 22 & 29 & 51 & 87 & 80 & 62 \\ 18 & 22 & 37 & 56 & 68 & 109 & 103 & 77 \\ 24 & 35 & 55 & 64 & 81 & 104 & 113 & 92 \\ 49 & 64 & 78 & 87 & 103 & 121 & 120 & 101 \\ 72 & 92 & 95 & 98 & 112 & 100 & 103 & 99 \end{bmatrix}$$

For higher compression ratios, poorer image quality, the $Q_{50}$ matrix can be multiplied by a scalar larger than 1 and clip all results to a maximum value of 255. For better quality images, but less compression, the $Q_{50}$ matrix can be multiplied by a scalar less than 1.

Therefore, the JPEG algorithm can be expressed as the following equation:

$$K(i, j) = \frac{1}{4} \frac{C(i)C(j)}{Q(i, j)} \sum_{m=0}^{m=7} \sum_{n=o}^{n=7} p(m, n) \cos\left[\frac{(2m+1)i\pi}{16}\right] \cos\left[\frac{(2n+1)j\pi}{16}\right]$$

Of note, the application of the quantization matrix with the DCT essentially eliminates many of the frequency components of the DCT alone. The example below illustrates this phenomenon.

For clarity of presentation, the example is limited to a single 8×8 image block from a stock image. For example, suppose the image array I for a single image block is:

$$I = \begin{bmatrix} 170 & 153 & 153 & 153 & 160 & 160 & 153 & 134 \\ 170 & 153 & 153 & 160 & 160 & 160 & 153 & 134 \\ 170 & 110 & 153 & 160 & 160 & 153 & 153 & 134 \\ 160 & 110 & 134 & 165 & 165 & 153 & 134 & 110 \\ 160 & 134 & 134 & 165 & 160 & 134 & 134 & 110 \\ 165 & 134 & 134 & 160 & 223 & 134 & 110 & 134 \\ 165 & 134 & 160 & 196 & 223 & 223 & 110 & 134 \\ 165 & 160 & 196 & 223 & 223 & 254 & 198 & 160 \end{bmatrix}$$

Initially, it is noted that all values in the I matrix are positive. Therefore, before continuing, the apparent DC bias in the image can be removed by subtracting a value, such as 128, from the matrix I. A new matrix I' results and is provided below.

$$I' = \begin{bmatrix} 42 & 25 & 25 & 25 & 32 & 32 & 25 & 6 \\ 42 & 25 & 25 & 32 & 32 & 32 & 25 & 6 \\ 42 & -18 & 25 & 32 & 32 & 25 & 25 & 6 \\ 32 & -18 & 6 & 37 & 37 & 25 & 6 & -18 \\ 32 & 6 & 6 & 37 & 32 & 6 & 6 & -18 \\ 37 & 6 & 6 & 32 & 95 & 6 & -18 & 6 \\ 37 & 6 & 32 & 68 & 95 & 95 & -18 & 6 \\ 37 & 32 & 68 & 95 & 95 & 126 & 70 & 32 \end{bmatrix}$$

From matrix algebra, the application of the DCT to the image array I is equivalent to multiplying the DCT matrix T by the matrix I. The result may then be multiplied with the transpose of T. From the DCT definition, the elements of the T matrix can be calculated by the equation:

$$T(i, j) = \sqrt{\frac{2}{M}} C(i) \cos\left[\frac{(2j+1)i\pi}{2M}\right]$$

where i and j are row and column numbers from 0 to 7. For convenience, the T matrix is presented below.

$$T = \begin{bmatrix} 0.3536 & 0.3536 & 0.3536 & 0.3536 & 0.3536 & 0.3536 & 0.3536 & 0.3536 \\ 0.4904 & 0.4157 & 0.2728 & 0.0975 & -0.0975 & -0.2778 & -0.4157 & -0.4904 \\ 0.4619 & 0.1913 & -0.1913 & -0.4619 & -0.4619 & -0.1913 & 0.1913 & 0.4619 \\ 0.4157 & -0.0975 & -0.4904 & -0.2778 & 0.2778 & 0.4904 & 0.0975 & -0.4157 \\ 03536 & -0.3536 & -0.3536 & 0.3536 & 0.3536 & -0.3536 & -0.3536 & 0.3536 \\ 0.2778 & -0.4904 & 0.0975 & 0.4157 & -0.4157 & -0.0975 & 0.4904 & -0.2778 \\ 0.1913 & -0.4619 & 0.4619 & -0.1913 & -0.1913 & 0.4619 & -0.4619 & 0.1913 \\ 0.975 & -0.2778 & 0.4157 & -0.4904 & 0.4904 & -0.4157 & 0.2778 & -0.0975 \end{bmatrix}$$

Continuing now with JPEG, the DCT may be applied to the image matrix I' by multiplying it with T on the left and the transpose of T on the right. Rounding the result, the following matrix I" is obtained.

$$I'' = \begin{bmatrix} 233 & 21 & -103 & 78 & 51 & 18 & 25 & 8 \\ -75 & 19 & 71 & -21 & -18 & 26 & -18 & 12 \\ 104 & -22 & -14 & 5 & -36 & -11 & 16 & -18 \\ -47 & 31 & 10 & -2 & 27 & -38 & -19 & 11 \\ 13 & -7 & 3 & -3 & -29 & 25 & -12 & -10 \\ -16 & -1 & -19 & 16 & 16 & -8 & 25 & -4 \\ 5 & -10 & 11 & -9 & 10 & 2 & -9 & 24 \\ -2 & 1 & 3 & -3 & -9 & 12 & 9 & -9 \end{bmatrix}$$

In order to consider the empirical data of human vision, each element of the I" matrix is divided by the corresponding element of a quantization matrix and each result is rounded. For example, if quantization matrix $Q_{50}$ is used, the result I" $Q_{50}$ is expressed below.

$$I''Q_{50} = \begin{bmatrix} 15 & 2 & -10 & 5 & 2 & 0 & 0 & 0 \\ -6 & 2 & 5 & -1 & -1 & 0 & 0 & 0 \\ 7 & -2 & -1 & 0 & -1 & 0 & 0 & 0 \\ -3 & 2 & 0 & 0 & 1 & 0 & 0 & 0 \\ 1 & 0 & 0 & 0 & 0 & 0 & 0 & 0 \\ -1 & 0 & 0 & 0 & 0 & 0 & 0 & 0 \\ 0 & 0 & 0 & 0 & 0 & 0 & 0 & 0 \\ 0 & 0 & 0 & 0 & 0 & 0 & 0 & 0 \end{bmatrix}$$

Of note, most of the elements in the result matrix round off to 0. In particular, only 19 of the 64 transformation coefficients are non-zero values. That is, JPEG has eliminated those components that were too small to overcome the human eye's lack of sensitivity to their spatial frequency.

If the quality level is dropped by using a quantization matrix, such as $Q_{10}$, approximately only 7 nonzero coefficients remain. Likewise, if the quality level is increased by using a quantization matrix, such as $Q_{90}$, approximately 45 coefficients remain. Therefore, for the most part, the JPEG algorithm utilizes relatively few of the 64 possible transformation coefficients of the DCT.

The number of terms that may bring a non-negligible contribution to the value of K(i,j) depends of the desired fidelity of the image. For example, only 10 to 30 of these 64 terms may bring a non-negligible contribution to the value of K(i,j), with 20 being the most common number. The JPEG algorithm obtains compression replacing the measurement and transmission of 64 pixel values (for each 8×8 tile) with the calculation and transmission of K(i,j) coefficient values. For example, if only 20 of these 64 terms bring a non-negligible contribution to the value of K(i,j), only these 20 coefficient values may be used to represent the image.

As discussed above, at the core of the JPEG algorithm is the division of the DCT coefficients of 8×8 tiles of the image of interest by the experimentally determined quantization values Q(i,j). To recover the actual image, the inverse Direct Cosine Transformation is applied to the K(i,j) coefficients.

The actual given value for a viewable pixel m,n would be given by:

$$p(m, n) = \frac{1}{4} \sum_{i=0}^{i=7} \sum_{i=0}^{i=7} C(i)C(j)Q(i, j)K(i, j) \cos \frac{(2m + 1)i\pi}{16} \cos \frac{(2n + 1)j\pi}{16}$$

Where:
p(m,n) is the pixel illumination for the image at the position m,n (within the 8×8 tile), Q(i,j) measures the eye sensitivity at the spatial frequencies i and j, and C(k) is given by:

$$C(k) = \begin{cases} \frac{1}{\sqrt{2}} & \text{for } k = 0 \\ 1 & \text{for } k > 0 \end{cases}$$

Returning to FIG. 2, display 100 by use of filter 106 produces actual video by using a video signal composed of K(i,j) values. Filter 106 may be composed of divisions 202 (or filter 106 may be made up of separate individual filters 202). Display unit 102 may be composed of multiple video divisions 204, such as pixels. Divisions 202 of filter 106 (or individual filters) may be arranged to be matched up to video divisions 204 in display unit 102. For example, divisions 202 (or individual filters) may be matched up with pixels in display unit 102.

Figure 2:
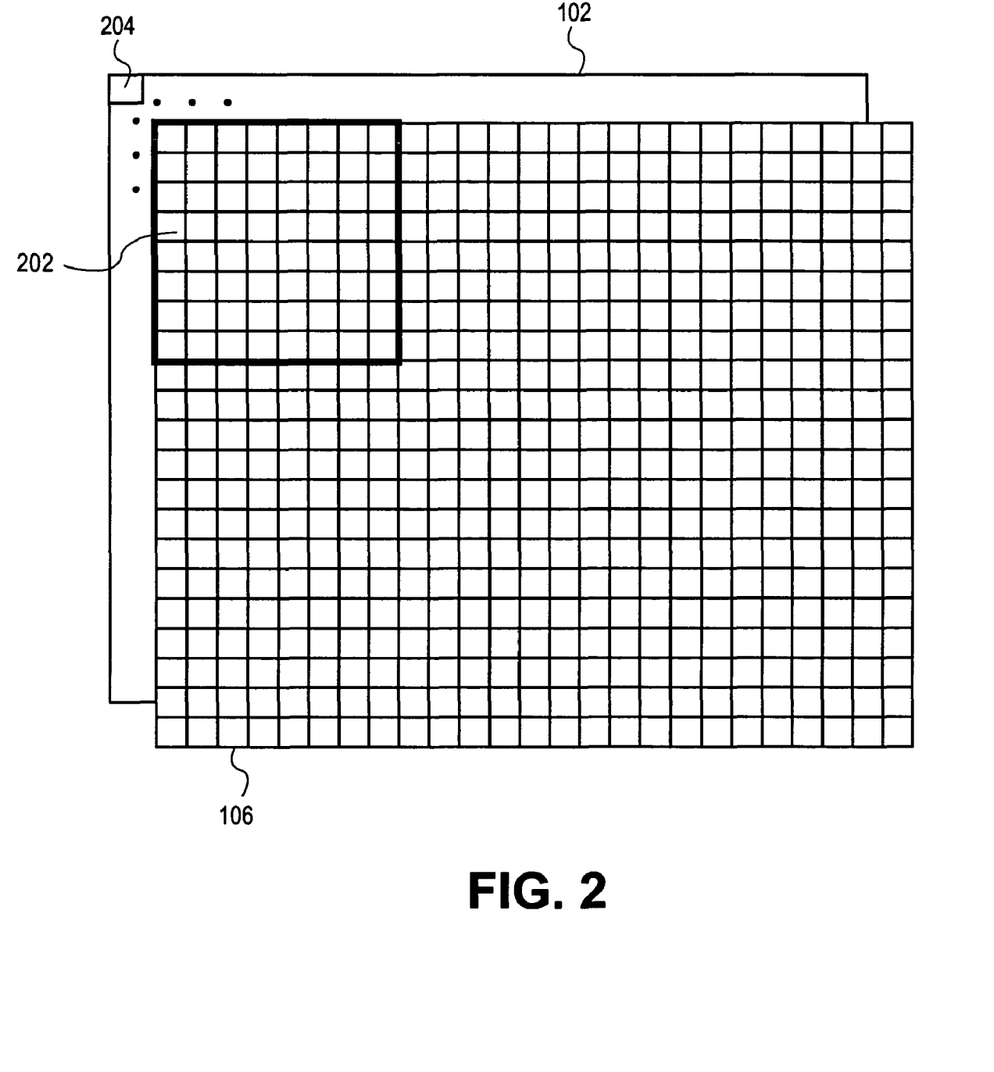
FIGS. 2-4, 5A, and 5B are diagrams illustrating an exemplary filter consistent with embodiments of the present teaching.

Video divisions 204 may be grouped into blocks. For example, video divisions 204 may be grouped into 8 video divisions by 8 video divisions block. Divisions 202 of filter 106 may also be grouped into blocks corresponding to the video division blocks. For example, division 202 may be grouped into a 8×8 division block 204.

Figure 3:
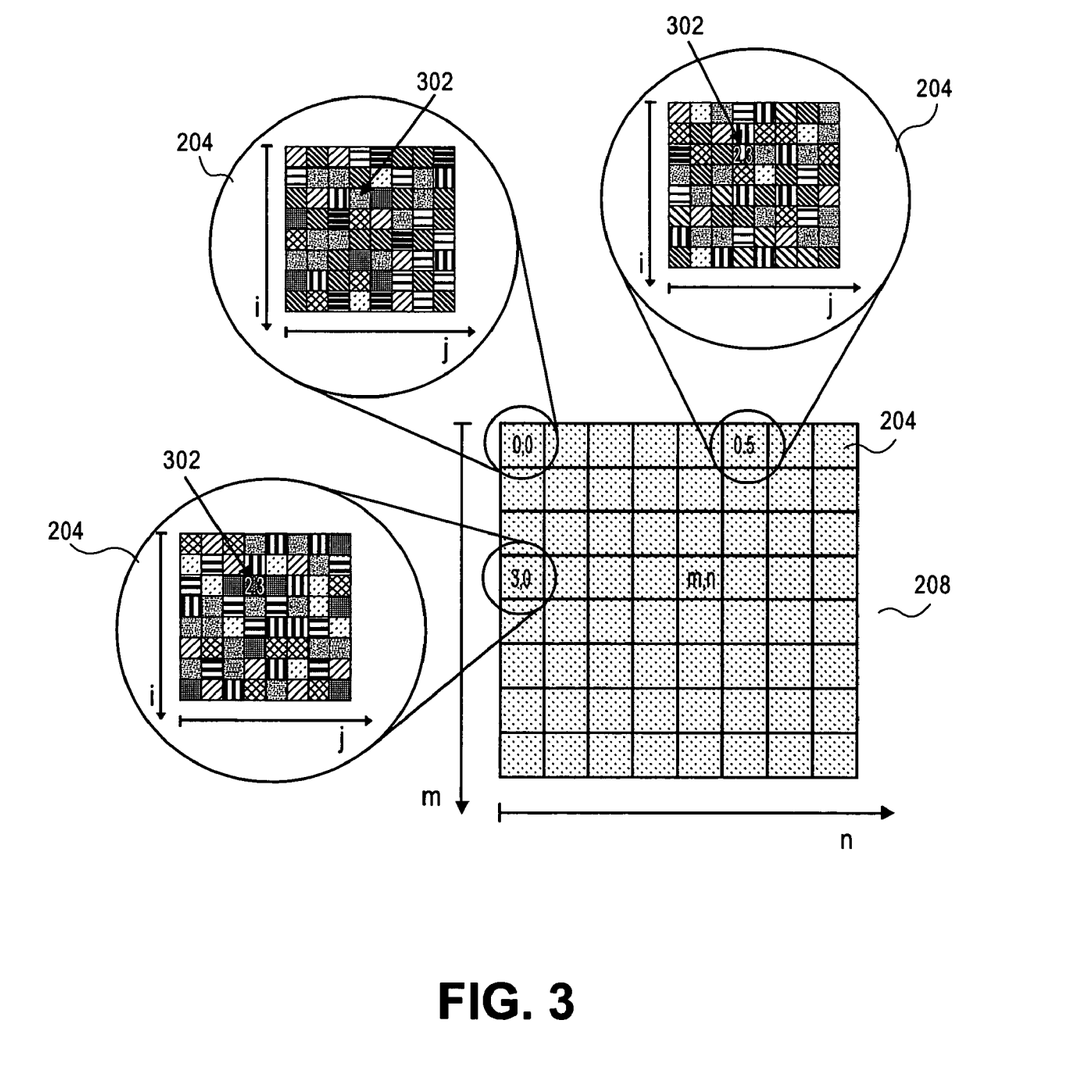

To properly display video using the transformation coefficients K(i,j), each division 204 of display unit 102 may be further divided into sub-divisions, such as sub-pixels. FIG. 3 is a diagram illustrating exemplary sub-divisions of video divisions 204 in an 8×8 block 208 of video divisions. As illustrated in FIG. 3, each video division 204 may represent a pixel m,n in display 102. Each video division 204 may be divided into sub-divisions 302. Each sub-division 302 may represent physical divisions of display unit 102. For example, if display unit 102 includes an LCD panel and light source, sub-divisions 302 may represent the physical LC cells or light source divisions of display unit 102

The number of the sub-divisions 302 may be equal to the number of transformation coefficients or partial coefficients, for example JPEG coefficients K(i,j). For example, as illustrated in FIG. 3, a particular video division 204 may be sub-divided into 64 sub-divisions 302. One skilled in the art will realize that the number of division is exemplary and that display unit 102 and filter 106 may be divided into any number of divisions and sub-divisions as required by the compression method.

Figure 4:
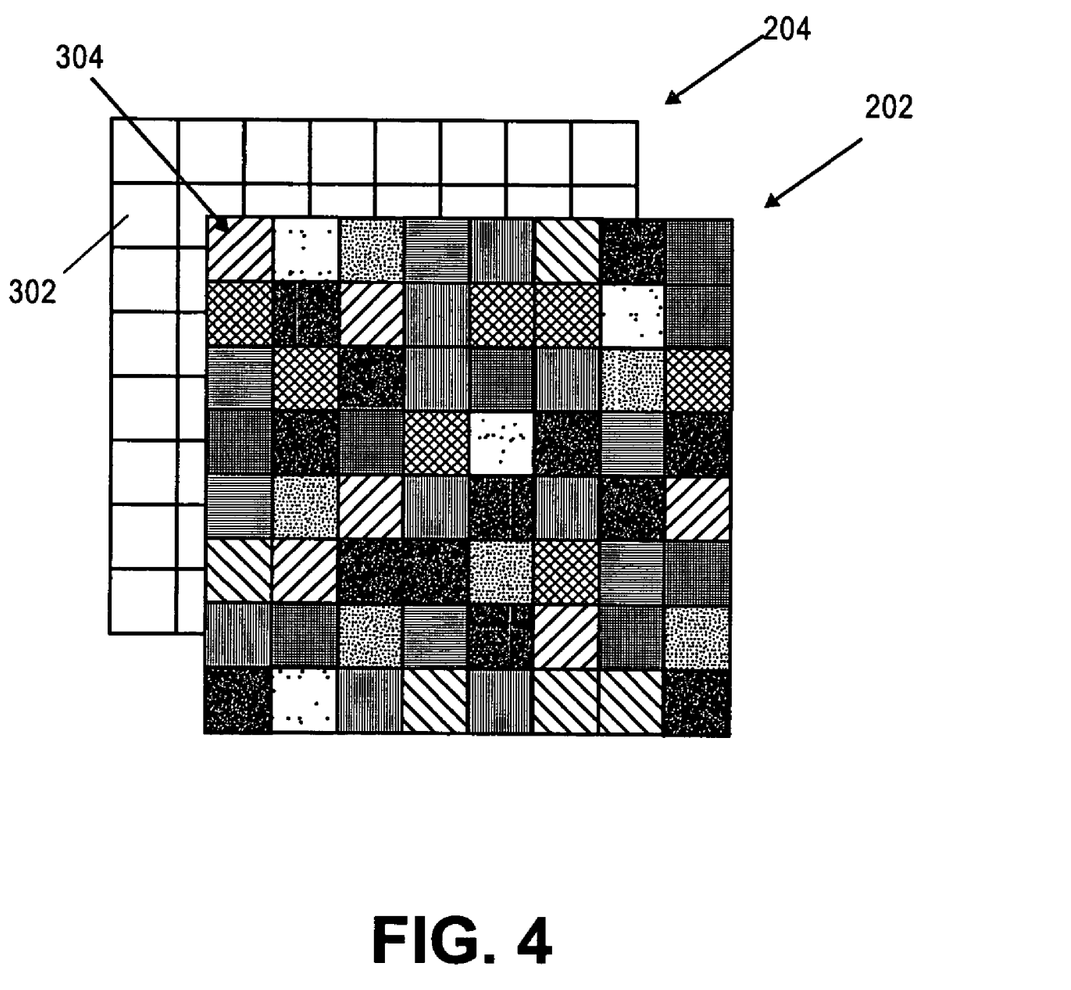

Each division 202 of filter 106 (or individual filter), which corresponds to a video division 204, may also be sub-divided. FIG. 4 is a diagram illustrating an exemplary video division 204 and division 202 of filter 106 consistent with embodiments of the present teaching. As illustrated in FIG. 4, division 202 may be divided into sub-divisions 304. Sub-divisions 304 may be aligned with individual video sub-divisions 302, for example sub-pixels, of display unit 102. For example, if display unit 102 includes an LCD panel and light source, sub-divisions 304 are aligned with the physical LC cells or light source divisions of display unit 102.

Display 100 produces actual viewable video by outputting from display unit 102 light corresponding to transform coefficients K(i,j). Each sub-division 302 of display unit 102 is driven with the corresponding transform coefficient K(i,j). Then, filter 106 transforms the light emitted from display unit 102 into actual viewable video. To achieve this, sub-divisions 302 have a transmissivity related to the inverse transformation coefficient or partial coefficient. For example, if the JPEG compression algorithm is utilized, the transmissivity may be given as follows:

$$C(i)C(j)Q(i,j)\cos\frac{(2m+1)i\pi}{16}\cos\frac{(2n+1)j\pi}{16}$$

Figure 5A:
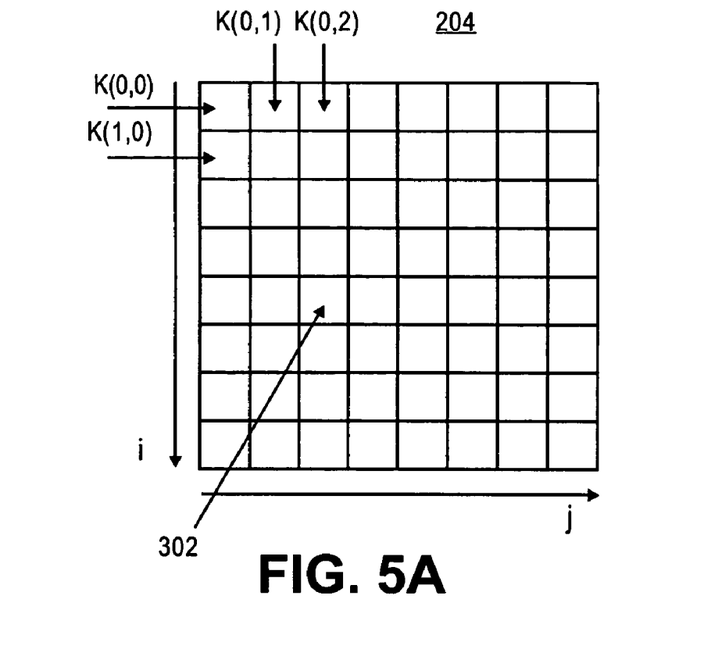
Figure 5B:
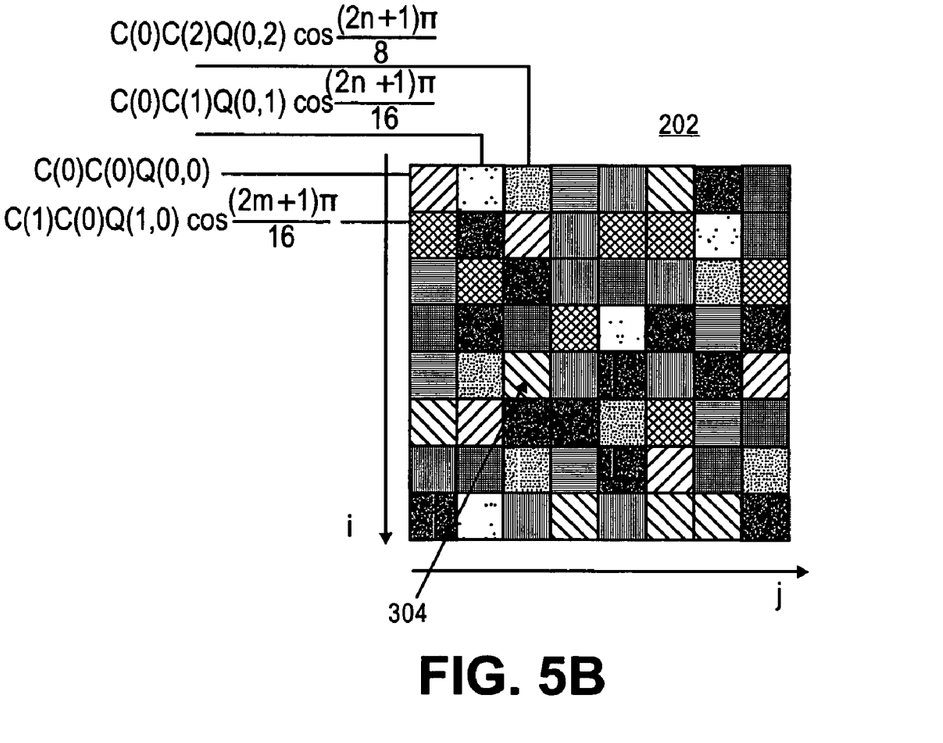

FIGS. 5A and 5B are diagrams illustrating the transform coefficients supplied to display unit 102 and the transmissivity of the corresponding sub-divisions of filter 106 for a particular pixel m,n. As illustrated in FIG. 5A, sub-divisions 302 may be supplied with different transformation coefficients or partial coefficients. For example, the transform coefficients may be supplied to display unit 102, for example, as follows:
  Sub-division 0,0—K(0,0);
  Sub-division 1,0—K(1,0);
  Sub-division 0,1—K(0,1); and
  Sub-division 0,2—K(0,2).

As such, the corresponding sub-division 304 of filter 106 may have a transmissivity related to the inverse transform coefficients or partial coefficients in order to transform the light emitted by sub-divisions 302 into actual viewable video. For example, as illustrated in FIG. 5B, sub-division 304 corresponding to sub-division 0,0 may have a transmissivity proportional to
  C(0)C(0)Q(0,0).

Sub-division 304 corresponding to sub-division 1,0 may have a transmissivity proportional to $$C(1)C(0)Q(1,0)\cos\frac{(2m+1)\pi}{16}.$$

Sub-division 304 corresponding to sub-division 0,1 may have a transmissivity proportional to $$C(0)C(1)Q(0,1)\cos\frac{(2n+1)\pi}{16}.$$

Sub-division 302 corresponding to sub-division 0,2 may have a transmissivity proportional to $$C(0)C(2)Q(0,2)\cos\frac{(2n+1)\pi}{8}.$$

where m,n is the position of the division in the 8×8 block. Accordingly, the video output by display 100 after processing by filter 106 would appear as actual viewable video.

One skilled in the art will also realize that any transformation or compression/decompression algorithm may be utilized to determine the number of sub-division of video division 204 and the transmissivities of filter 106. For example, the number of sub-division of video divisions 204 and the transmissivities of filter 106 may be related to transformation values in the MPEG algorithm.

FIGS. 2-4, 5A, and 5B illustrate 64 K(i,j) sub-divisions for each division (or individual filter). Display unit 102 and filter 106 may be divided into less sub-divisions such as 20. One skilled in the art will realize that display unit 102 and filter 106 may be divided into any number of sub-divisions depending on the desired number of transform coefficients or partial coefficients.

Figure 6:
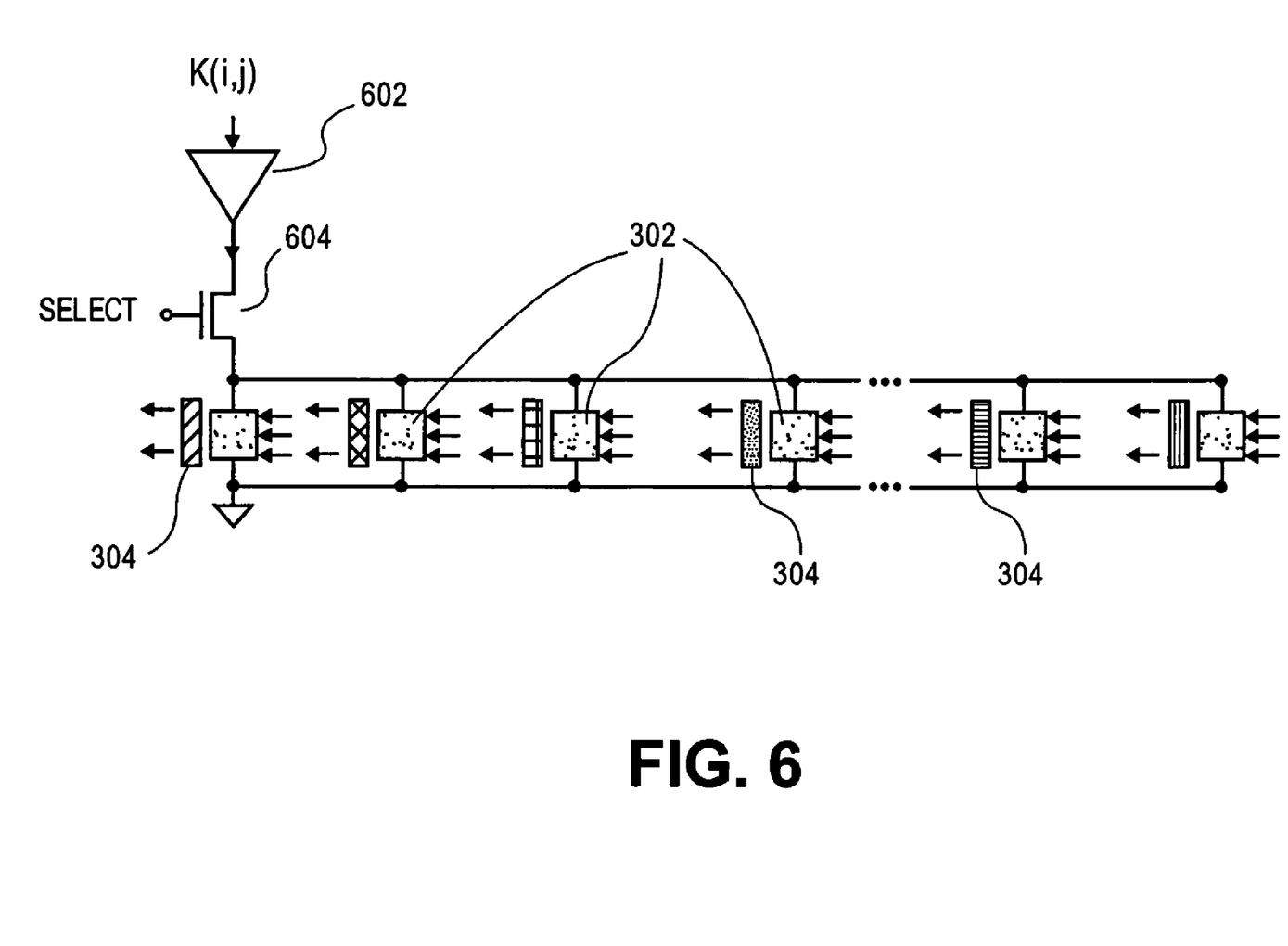
FIG. 6 is a diagram illustrating an exemplary driving circuit consistent with embodiments of the present teaching.

Since the video signal supplied to each corresponding sub-division in different divisions of a common 8×8 of display unit 102 represent the same transform coefficient or partial coefficient, all the sub-divisions having the same transform coefficient or partial coefficient may be connected in parallel in order to receive the same signal. FIG. 6 is a schematic diagram illustrating a driving circuit 600 for supplying a video signal to sub-divisions 302, for example sub-pixels, in different divisions, for example pixels m,n in a common 8×8 block. For example, driving circuit 600 may be utilized to supply K(0,1) to all sub-divisions 0,1 in pixels m,n in an 8×8 block. Sub-divisions 302 may be, for example, the individual LC cells if a LC panel is utilized. Driving circuit 600 may be included in display control 104.

It should be readily apparent to those of ordinary skill in the art that driving circuit 600 illustrated in FIG. 6 represents a generalized schematic illustration and that other components may be added or existing components may be removed or modified. Further, one skilled in the art will realize that display device 100 would have a driving circuit 600 for each different transform coefficient K(i,j).

As illustrated in FIG. 6, driving circuit 600 comprises an amplifier 602 and a transistor 604 coupled to amplifier 602. Amplifier 602 amplifies the signal supplied, which corresponds to K(i,j), to sub-divisions 302 of display unit 102. Transistor 604 controls when the video signal, which corresponds to K(i,j), is supplied to sub-divisions 302 of display 102.

As illustrated in FIG. 6, transistor 604 is coupled in parallel to each sub-divisions i,j for different divisions m,n. For example, for sub-division 0,1, transistor 604 may be coupled to each sub-division 0,1 in all divisions 204 of an 8×8 block.

As illustrated in FIG. 6, sub-divisions 304 of filter 106 are placed in front of the corresponding sub-divisions 302 of display unit 102. Accordingly, the video output by display 100 after inverse transforming by filter 106 would appear as actual viewable video.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A display configured to display compressed video, the display comprising:
  a display unit comprising a plurality of pixels, each pixel of the plurality comprising sub-divisions, each subdivision of a pixel being electronically connected in parallel with other similarly situated sub-divisions of other pixels of the plurality;

a plurality of driving circuits coupled to each subdivision of the plurality of pixels in the display unit, wherein each driving circuit supplies a video signal representing compressed video corresponding to the similarly situated sub-divisions connected in parallel;

wherein each driving circuit comprises a transistor that is directly connected with each of the similarly situated sub-divisions in parallel and controls when the video signal is supplied to the sub-divisions connected in parallel; and a set of filter elements positioned adjacent to the display unit, wherein the set of filter elements optically decompress the compressed video;

wherein each filter element of the set of filter elements comprises sub-divisions corresponding to the sub-divisions in an adjacent pixel;

wherein corresponding sub-divisions of the set of filter elements have transmissivities related to coefficients or partial coefficients of an inverse image transform;

and wherein the pixels and the set of filter elements are arranged in a plurality of pixel blocks.

2. The display of claim 1, wherein the pixel blocks comprise a block of 8 pixels by 8 pixels.

3. The display of claim 1, wherein each pixel of the display unit comprises 8 sub-divisions by 8 subdivisions.

4. The display of claim 1, wherein each pixel of the display unit comprises less than 8 sub-divisions by 8 subdivisions.

5. The display of claim 1, wherein the coefficients or partial coefficients are terms of product terms in sub-terms of a sum of products inverse transform.

6. The display of claim 5, wherein the sum of products inverse transform is defined by the JPEG compression algorithm.

7. The display of claim 5, wherein the sum of products inverse transform is defined by the MPEG compression algorithm.

8. A display configured to display compressed video by transforming light emitted by a display unit, the display comprising:

a display unit comprising video divisions, wherein video divisions are arranged in blocks and each video division comprises sub-divisions, each sub-division being electronically connected in parallel with similarly situated sub-divisions in other video divisions;

a set of filter elements positioned adjacent to-the display unit, each filter element of the set of filter elements comprises sub-divisions corresponding to the sub-divisions in an adjacent video division, the corresponding sub-divisions of the set of filter elements have transmissivities related to coefficients or partial coefficients of an inverse compression transform; and a set of driving circuits coupled to the display unit, wherein each driving circuit is coupled to corresponding sub-divisions of different video divisions in a block;

wherein each driving circuit supplies a video signal representing compressed video corresponding to the similarly situated sub-divisions connected in parallel;

wherein each driving circuit comprises a transistor that is directly connected with each of the similarly situated sub-divisions in parallel and controls when the video signal is supplied to the sub-divisions connected in parallel.

9. The display of claim 8, wherein the blocks comprise a block of 8 video divisions by 8 video divisions.

10. The display of claim 8, wherein each video division of the display unit comprises 8 sub-divisions by 8 sub-divisions.

11. The display of claim 8, wherein each video division of the display unit comprises less than 8 sub-divisions by 8 sub-divisions.

12. The display of claim 8, wherein the coefficients or partial coefficients are terms of product terms in sub-terms of a sum of products inverse transform.

13. A device, comprising:

a video source capable of providing a compressed video signal evidencing transformation coefficients of a compression method;

a display unit, the display unit comprising a pixel array, each pixel of the pixel array comprising sub-divisions, each sub-division of a pixel being electronically connected in parallel with other similarly situated sub-divisions of other pixels of the pixel array; and a display including a set of filter elements positioned in front of the display unit, the filter elements configured to decompress and display the compressed video signal based on the inverse transformation coefficients or partial inverse transformation coefficients of the compression method wherein each filter element of the set of filter elements comprises sub-divisions corresponding to the sub-divisions in an adjacent pixel;

a plurality of driving circuits coupled to each subdivision of the plurality of pixels in the display unit, wherein each driving circuit supplies a video signal representing compressed video corresponding to the similarly situated sub-divisions connected in parallel;

wherein each driving circuit comprises a transistor that is directly connected with each of the similarly situated sub-divisions in parallel and controls when the video signal is supplied to the sub-divisions connected in parallel; and and wherein the pixels and the set of filter elements are arranged in a plurality of pixel blocks.

14. The device of claim 13, wherein the display pixel array is positioned adjacent to the filter elements.

* * * * *